Feb. 1, 1949.  H. A. BERLINER  2,460,483
CUTTING MEANS FOR METAL STRETCHING DIES
Filed March 27, 1945
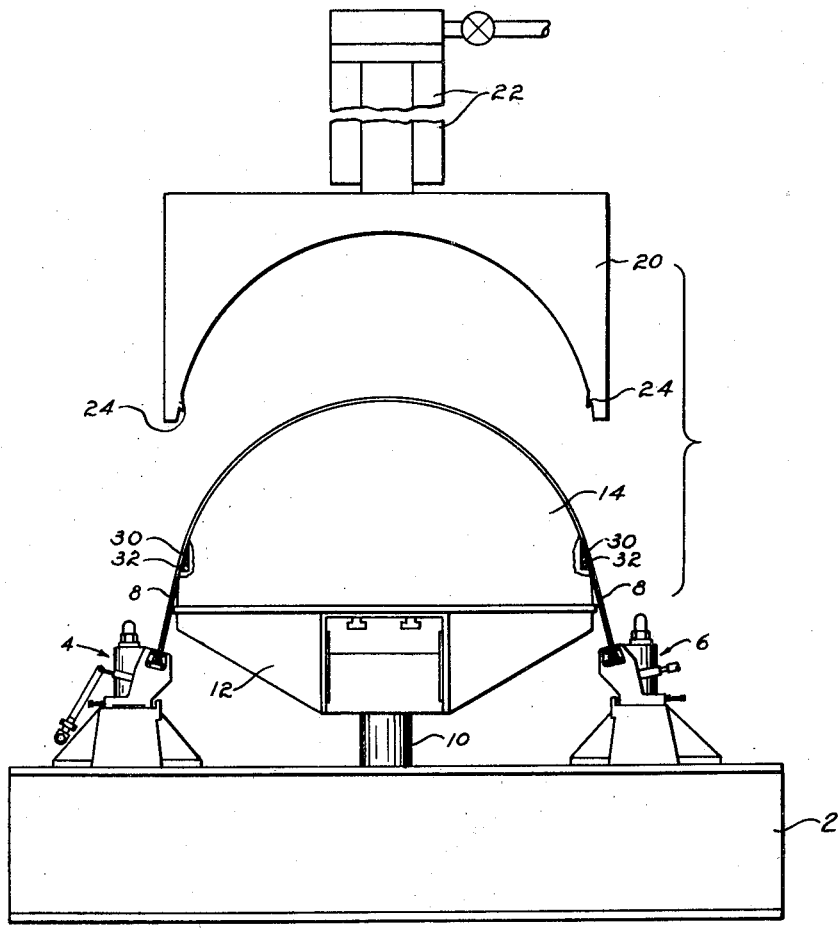
Inventor
HENRY A. BERLINER
By Scrivener & Parker
Attorneys Patented Feb. 1, 1949

2,460,483

UNITED STATES PATENT OFFICE 2,460,483

CUTTING MEANS FOR METAL STRETCHING DIES

Henry A. Berliner, Washington, D. C., assignor to Engineering and Research Corporation, Riverdale, Md., a corporation of Maryland Application March 27, 1945, Serial No. 585,116

2 Claims. (Cl. 153—2)

This invention relates to machines for changing sheet metal from an initial flat condition to a permanent concavo-convex shape by anchoring the edges of the sheet and then forcing against the free intermediate part of the sheet a convex form having the shape of the finally formed sheet.

In the known manufacture of formed sheets by the use of such machines, it is necessary after the shaping operation to remove the sheet from the machine and cut it to the desired size, as by trimming the edges. This additional operation is made difficult to perform for the reason, among others, that after being removed from the machine the sheet, because of its usual flexibility, is very hard to handle, particularly if it is of considerable size.

The principal object of my invention, which is achieved by the means disclosed in this application, has been to provide a sheet metal stretching press of the described type including means which will operate to sever the sheet along the desired line following the forming operation and before removal of the sheet from the machine, whereby the sheet may be taken from the machine in its final, finished form and size.

Other objects and features of novelty of the invention will be made apparent by the following description and the appended drawings which, it will be understood, are only illustrative of the invention and impose no limitation thereon not imposed by the claims.

The single figure of the drawing is a side view of a sheet metal stretching machine embodying the improvements provided by this invention.

A sheet metal stretching machine including means according to the invention is disclosed in Fig. 1 and comprises a plurality of parallel transverse beams 2 which support two spaced, longitudinally-extending clamp members 4, 6, which are adapted to grip the edges of a sheet of metal which is shown at 8 and the intermediate part of which is to be formed to a desired shape. Between the clamp members 4, 6 is arranged a vertically movable hydraulic ram 10 having a platform 12 at its upper end to which is attached a form 14, the upper surface of which corresponds exactly in shape to the desired shape of the finished sheet metal part. In the operation of such well-known machines the ram is moved upwardly, by means (not shown) such as hydraulic means, against the intermediate portion of the sheet, stretching and forming the same to the shape of the upper surface of the form.

Means are provided by the invention for cutting the sheet after stretching it by the head 14 and while the head is raised against the work. Such means comprise a cutting head 20 which is positioned vertically above the stretching head 14 and which may be moved vertically toward and away from the stretching head by preferably hydraulic ram means shown schematically at 22. In a preferred form of the invention the lower surface of the head 20 is concave and is shaped correspondingly to the upper surface of the stretching head 14. Within the concave upper head 20 and extending outwardly from the wall thereof are cutting members 24 which, in plan, correspond in size and shape to the desired size and shape of the edge of the finished sheet. For example, if a hemi-spherical piece is to be formed on a stretching press according to this invention, the lower or stretching head 14 will have a convex hemi-spherical shape, the concavity of the upper head will be hemi-spherical in shape and of the same size as the lower head and the cutting member 24 will be circular in plan and of a diameter equal to the diameter of the free edge of the finished hemi-spherical sheet. It will be apparent that the upper head need not be concave or shaped similarly to the lower head. If desired, the cutting members 24 may be supported directly, or by means of a frame-work, on the hydraulic ram means 22.

In the use and operation of a machine according to my invention, a convex lower head having the desired shape of the finished piece is mounted on the lower ram 10, 12, and an upper head with cutting members formed in the described manner is supported on the upper ram means 22. These heads being mounted on the machine and the flat sheet being put into place with its edges clamped, the lower head is raised to stretch and form the sheet. While the lower head is in its raised position the upper head is forced downwardly over and against it, the cutting members 24 and convex surface of the lower head interfitting, whereby the cutting members 24 will be forced against the sheet metal 8 to thereby cut the same to the desired size and shape of the free edge of the finished sheet. The lower head may then be lowered, either before or after raising of the upper head, and the finished, cut and trimmed sheet removed therefrom.

In a preferred form of my invention the lower head is provided with means for receiving the cutting member or members 24 when the cutting members are forced against the lower head. Such means preferably comprise a recess or recesses 30 within the upper surface of the lower head and which are of the same shape and location as the cutting members. If desired, and as shown in the drawing, each recess 30 may be filled with rubber or other suitable material 32 which will yield under the pressure of the cutting members and which is preferably externally flush with the outer convex surface of the lower vertically movable head.

While I have described and illustrated one embodiment of my invention it will be apparent to those skilled in the art that other embodiments, as well as modifications of that disclosed, may be made without departing in any way from the spirit or scope of the invention, for the limits of which reference must be had to the claims.

What I claim is:

1. In combination with a sheet metal stretching machine of the type comprising spaced fixed means for anchoring the edges of a piece of sheet metal and vertically movable means therebetween having a convex upper surface adapted to be forced against the free intermediate part of the sheet metal to shape the same, vertically movable means above said convex surface having a concave lower surface, cutting means extending inwardly from said concave surface for cutting a free edge of the finished and shaped sheet, and means for forcing said upper vertically movable means and said cutting means downwardly against said convex surface to cut the sheet formed thereon.

2. In combination with a sheet metal stretching machine of the type comprising spaced fixed means for anchoring the edges of a piece of sheet metal and vertically movable means therebetween having a convex upper surface adapted to be forced against the free intermediate part of the sheet metal to shape the same, vertically movable means above said convex surface having a concave lower surface corresponding in size and shape to the convex upper surface therebeneath, cutting means extending inwardly from said concave surface for cutting the finished and shaped sheet, and means for forcing said upper vertically movable means and said cutting means downwardly against said convex surface to cut the sheet formed thereon.

HENRY A. BERLINER.

REFERENCES CITED

The following references are of record in the file of this patent:

UNITED STATES PATENTS

| Number | Name | Date |
| --- | --- | --- |
| 884,218 | Schwarz | Apr. 7, 1908 |
| 1,245,059 | Strand | Oct. 30, 1917 |
| 1,286,064 | Murray | Nov. 26, 1918 |
| 1,482,732 | Calleson | Feb. 5, 1924 |
| 1,589,456 | Beghetti | June 22, 1926 |
| 1,665,203 | Delf | Apr. 10, 1928 |
| 1,710,261 | Kellogg | Apr. 23, 1929 |
| 1,861,648 | Vehko | June 7, 1932 |
| 1,905,496 | Peo | Apr. 25, 1933 |
| 2,006,468 | Longren | July 2, 1935 |
| 2,129,774 | Kuhner | Sept. 13, 1938 |
| 2,245,723 | Salzmann | June 17, 1941 |
| 2,308,998 | Misfeldt | Jan. 19, 1943 |
| 2,321,085 | Hubbard | June 8, 1943 |